United States Patent [19]

Shivers et al.

[11] Patent Number: 4,873,819

[45] Date of Patent: Oct. 17, 1989

[54] GRASS TRIMMER

[76] Inventors: Charles C. Shivers, 614 W. English, Corydon, Iowa 50060; Alvin Arnold, 505 N. Front St., Humeston, Iowa 50123

[21] Appl. No.: 232,564

[22] Filed: Aug. 12, 1988

Related U.S. Application Data

[63] Continuation of Ser. No. 924,276, Oct. 29, 1986, abandoned.

[51] Int. Cl.[4] ............................................. A01D 34/63
[52] U.S. Cl. ....................................... 56/17.5; 56/12.7
[58] Field of Search ...................... 56/12.7, 255, 17.5, 56/295

[56] References Cited

U.S. PATENT DOCUMENTS

| | | | |
|---|---|---|---|
| 163,486 | 5/1951 | Sanford | 56/256 |
| 2,708,335 | 5/1955 | Newton | 56/256 |
| 2,712,719 | 7/1955 | Martin | 56/10.5 |
| 3,034,275 | 5/1962 | Happe et al. | 56/11.1 |
| 3,221,481 | 12/1965 | Mattson et al. | 56/16.9 |
| 3,350,864 | 11/1967 | Sheps et al. | 56/16.9 |
| 3,490,213 | 1/1970 | Pinto | 56/16.9 |
| 3,516,234 | 6/1970 | Snook | 56/16.9 |
| 3,531,922 | 10/1970 | Hansen | 56/13.7 |
| 3,625,292 | 12/1971 | Lay | 56/256 |
| 3,627,055 | 12/1971 | Lay | 56/256 |
| 3,686,839 | 8/1972 | Lambert | 56/11.6 |
| 3,690,384 | 9/1972 | Patterson | 56/13.7 |
| 3,803,818 | 4/1974 | Chaney | 56/11.6 |
| 3,859,776 | 1/1975 | Ballas et al. | 56/12.7 |
| 4,023,332 | 5/1977 | Achenbach et al. | 56/16.9 |
| 4,033,098 | 7/1977 | Green | 56/17.5 |
| 4,043,101 | 8/1977 | Lahr et al. | 56/17.1 |
| 4,068,376 | 1/1978 | Briar | 56/12.7 |
| 4,084,395 | 4/1978 | Nannen | 56/15.4 |
| 4,170,099 | 10/1979 | Owens | 56/16.9 |
| 4,453,372 | 6/1984 | Remer | 56/13.7 |
| 4,463,544 | 8/1984 | Carsello et al. | 56/17.1 |

Primary Examiner—John Weiss
Attorney, Agent, or Firm—Litman, McMahon & Brown

[57] ABSTRACT

A grass trimmer includes a structural support frame, a single ground engaging wheel connected to the frame, a rotary trimmer positioned to rotate around the wheel, a motor mechanism to drive the trimmer mechanism and a user handle attached to the frame. The single wheel and location of the wheel relative to the trimmer mechanism allows the operator to very accurately guide the apparatus and to adjust the cutting height of the trimmer quickly and easily to the terrain by tilting of the apparatus about the wheel to one side or the other or from front to back by rotation about the axis of the wheel.

10 Claims, 3 Drawing Sheets

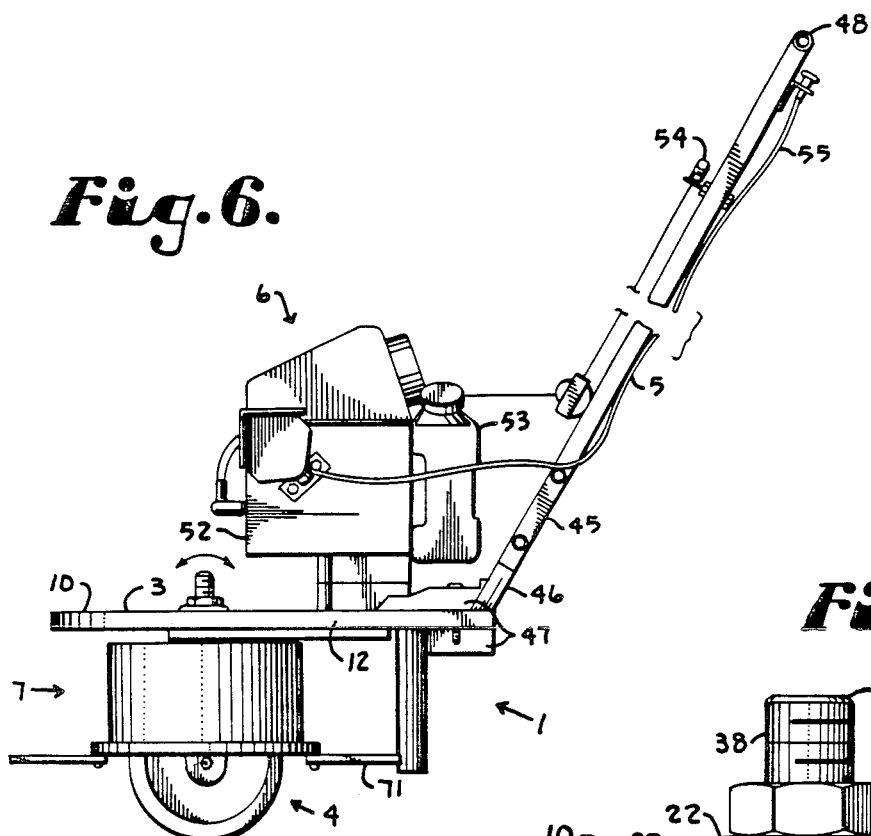
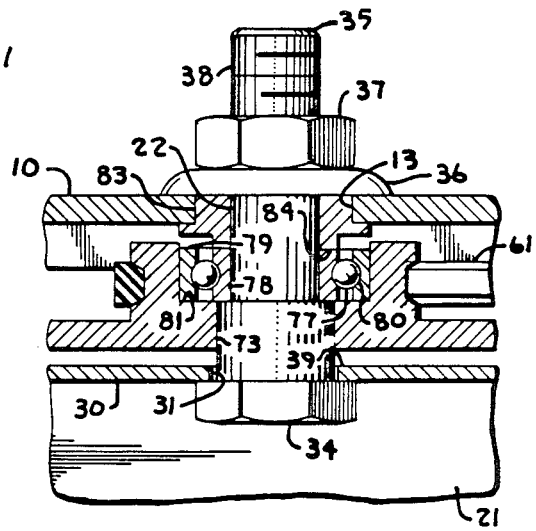
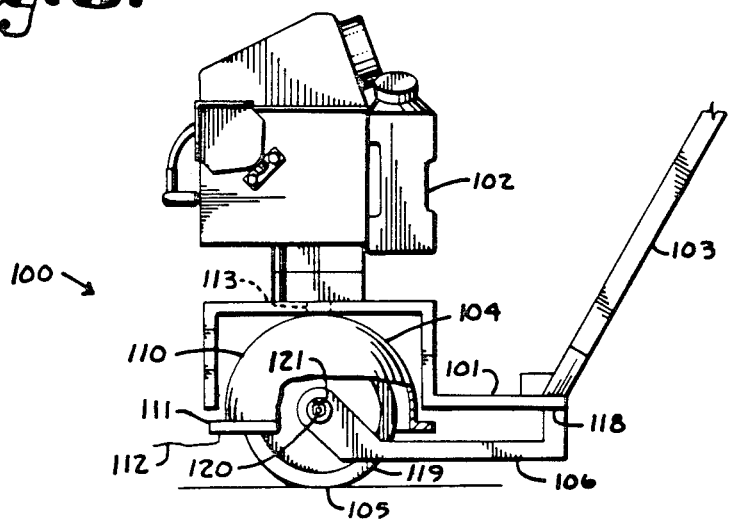

GRASS TRIMMER

This is a continuation of application Ser. No. 924,276 filed Oct. 29, 1986 and was abandoned Aug. 12, 1988.

BACKGROUND OF THE INVENTION

The present invention relates to grass and weed trimmers of the type wherein a plastic filament or blade is rotated at a relatively high rate and allowed to engage and cut the grass or weeds.

In recent years, various grass trimmers utilizing a plastic filament which is fed from a rotating head or the like have become very popular. Such trimmers are available in a wide variety of shapes and sizes and may be both electrically powered from a cord or driven by a self-contained engine. Such trimmers are normally utilized to augment conventional push or riding-type lawnmowers in areas where the terrain is too rough to take a lawnmower or for trim work in areas which are not easily accessible to a regular lawnmower.

Certain professionals in the lawn keeping business are required to use trimmers of this type much more frequently than other users. For example, caretakers of cemeteries must often cut grass near cemetery markers which cannot be closely approached by lawnmowers. Because of the volume of trimming which must be done in areas such as cemeteries and because many of such trimmers must be carried, users typically become tired very quickly. For this reason, there have been attempts in the past to design a grass trimmer with a support wheel which would allow the user to easily guide the rotating heads to the areas which need to be cut, yet the wheel would allow the trimmer to be sufficiently supported so that the user would not become tired too quickly. Such a trimmer is shown in the U.S. Pat. to Green, No. 4,033,098. While the device shown in the Green reference was an improvement over the prior art, the support wheel was positioned away from the rotating head and this made positioning of the head somewhat cumbersome.

In order to allow best control over the inclination and position of the rotating head, applicants determined that it would be best to have the wheel positioned as closely as possible to the rotating head and, in particular, directly beneath it, if possible. This, of course, presented problems in the design of such a trimmer, since the head had to be able to rotate freely without rotating the wheel and/or hitting the wheel during rotation.

Lawnmower structures having multiple wheels, especially riding lawnmowers, have been previously manufactured with a rotating blade surrounding a wheel of the structure, for example U.S. Pat. No. 4,084,395. However, because lawnmower structures have multiple wheels in contact with the ground, the rotating cutting mechanism is basically designed to rotate only in a horizontal plane. Because of this, the operator cannot rotate the cutting head from side to side to get closer or further from the ground as necessary and mobility is somewhat hampered since there is normally a substantial turning radius associated with a multi-wheel riding or push mower and/or it is relatively difficult to use a multi-wheeled machine where a great number of tight turns must be made, such as when cutting around a cemetery headstone and fencing. On the other hand, applicants have found that a single wheel trimmer allows both the benefit of simple height adjustment of the cutting mechanism necessitated by changes in terrain and the like by either rotating the trimmer from side to side or front to back about the wheel and also provides great mobility since the radius of turn for a single wheel vehicle is normally quite small compared to a multi-wheel vehicle.

OBJECTS OF THE INVENTION

Therefore, the objects of the present invention are: to provide a grass trimmer which has a high degree of mobility; to provide such a trimmer which has a cutting head which rotates about a single support wheel so as to provide to the operator substantial control of the position of the cutting head by tilting the device from side to side or front to back about the single wheel while remaining stationary or traversing a surface; to provide such a device wherein support is provided by a single wheel; and to provide such a device which is relatively easy to manufacture, simple to use and particularly well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 6 is a side elevational view of the trimmer on a reduced scale.

FIG. 7 is a fragmentary, enlarged and cross-sectional view of the trimmer, showing detail from FIG. 5.

FIG. 8 is a fragmentary side elevational view of a modified trimmer in accordance with the present invention.

DETAILED DESCRIPTION OF THE INVENTION

Figure 1:
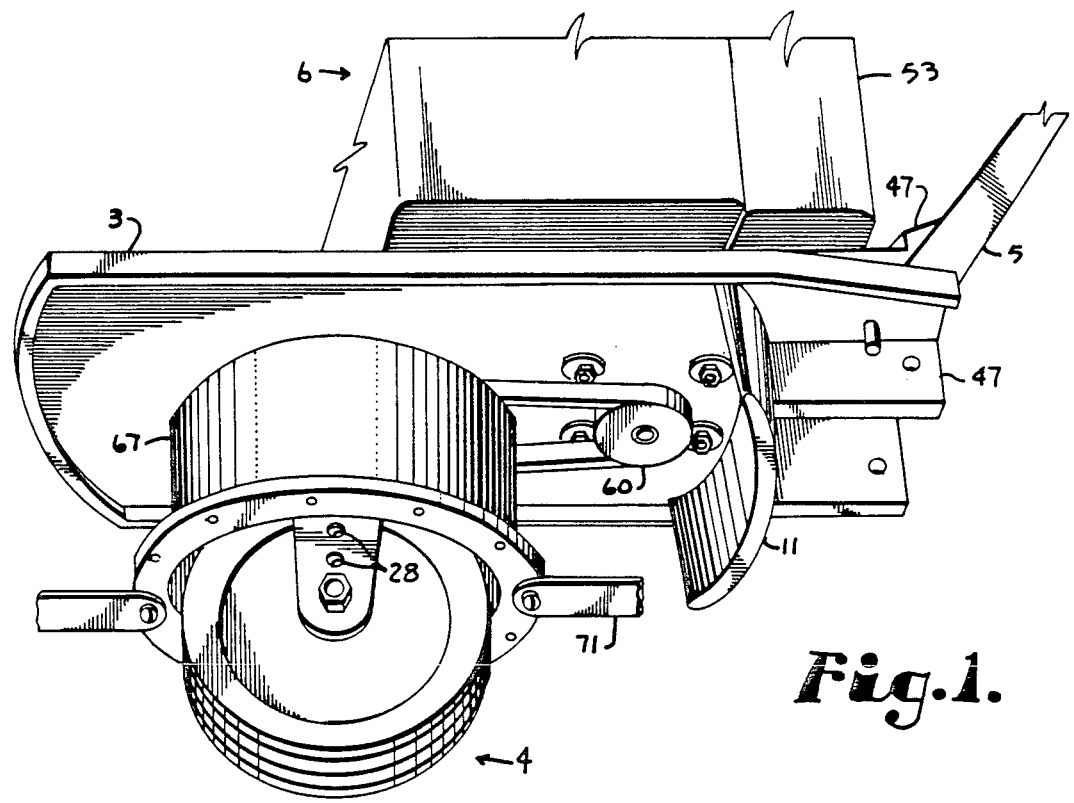
FIG. 1 is a fragmentary perspective view of a grass trimmer in accordance with the present invention.
Figure 2:
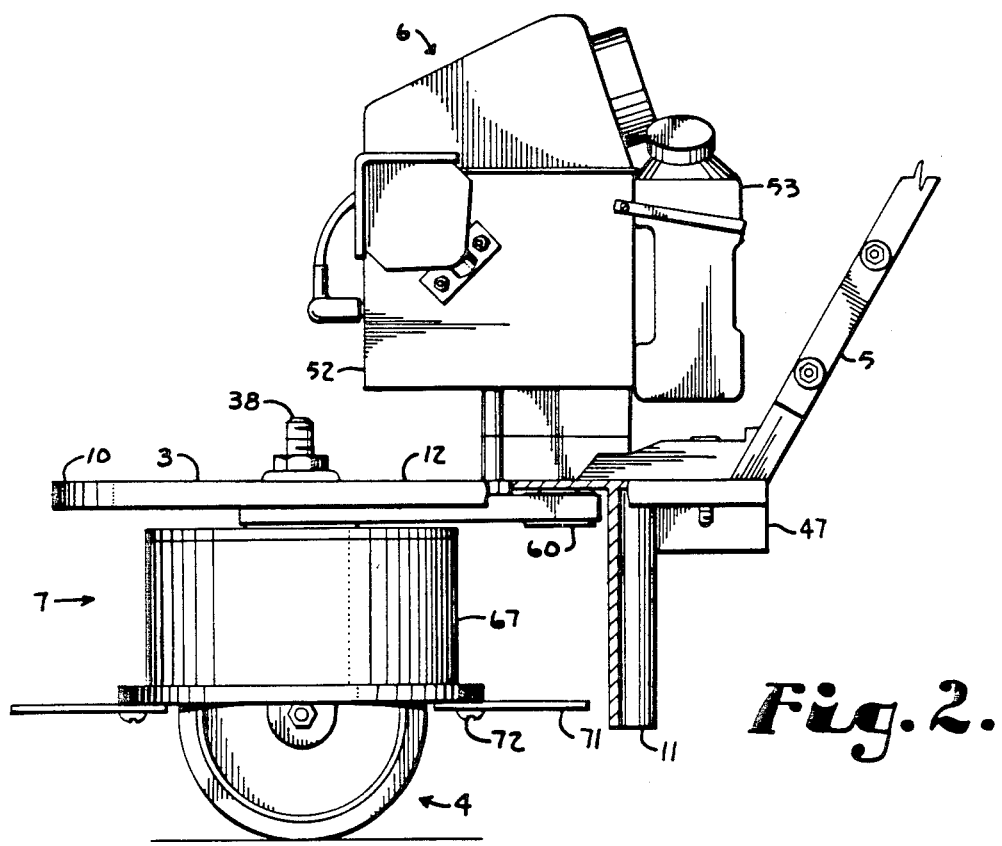
FIG. 2 is a fragmentary side elevational view of the trimmer with portions removed to show detail thereof.
Figure 3:
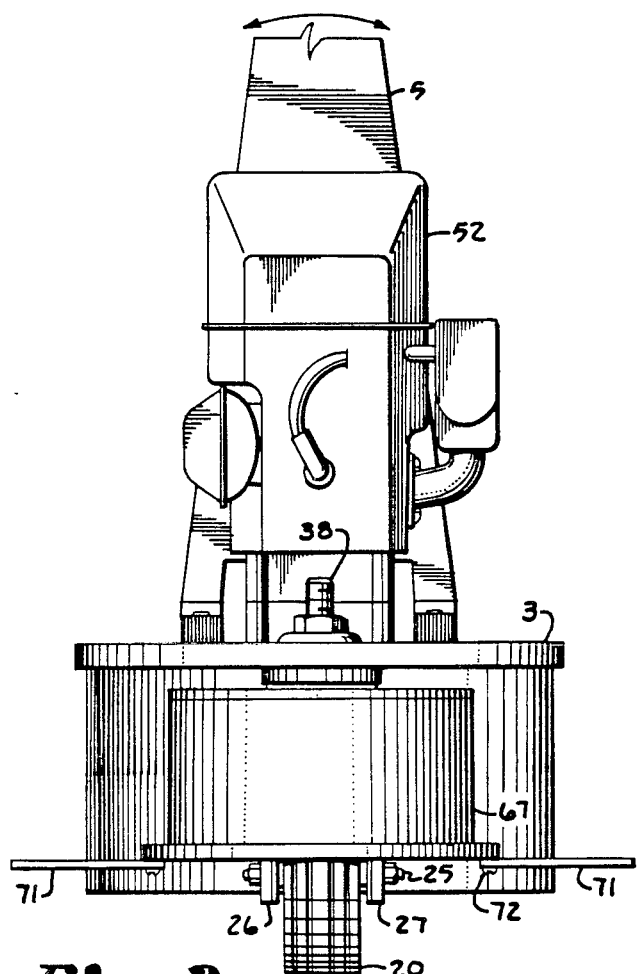
FIG. 3 is a fragmentary front elevational view of the trimmer.
Figure 4:
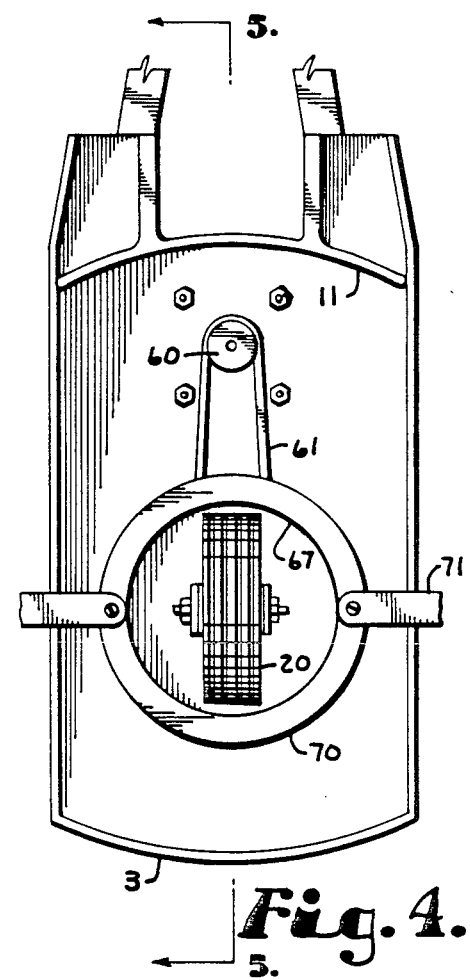
FIG. 4 is a fragmentary bottom plan view of the trimmer on a reduced scale.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Illustrated in FIGS. 1 through 7 is a first trimmer apparatus in accordance with the present invention and generally designated by the reference numeral 1. The trimmer apparatus 1 includes a support structure 3, wheel means such as the wheel mechanism 4, a handle 5, motor means such as motor mechanism 6 and rotatable trimmer means such as the trimmer mechanism 7.

The support structure 3 includes a main support plate 10 which is often aligned in a horizontal plane during operation, but which can be tilted or rotated from side to side and from front to back as will be described later. Depending from the main support plate 10 near a rearward end thereof (to the right in FIG. 2) is a deflection shield 11, positioned to divert rocks and other flying debris from striking an operator and having a semi-circular shape. Extending downwardly around the front and sides of the support plate 10 is a lip or side stiffener 12 to increase the stability of the plate 10. As seen in FIG. 7, there is an aperture 13 approximately centered from side to side in the support plate 10 and located approximately one-third of the distance from the front of the plate 10 to the rear thereof. A second aperture 14 is located along a front to rear axis of the plate 10 directly rearward of the aperture 13 and approximately one-third of the distance from the rear of the plate 10. The aperture 13 and the aperture 14 will be discussed later and are related to the wheel mechanism 4 and the motor mechanism 6 respectively.

The wheel mechanism 4 comprises a single ground engaging support wheel 20 which rotates generally in a vertical plane parallel to the direction of travel of the apparatus 1, although the wheel can be tilted from side to side as will be described later. The wheel 20 is mounted on a clevis 21 which is attached to the support structure plate 10 by a spindle 22. In particular, the wheel 20 is mounted in fixed spaced relationship below the support plate 10 such that the wheel 20 is aligned to rotate in a plane that passes through the front to rear axis of the apparatus 1 and which is generally perpendicularly aligned relative to the plane of the plate 10.

The wheel 20 is mounted on an axle 25 which is in turn mounted on sides 26 and 27 of the clevis 21 through suitable apertures 28 therein. Multiple apertures 28 are provided in vertically spaced relation along the sides 28 to allow the wheel 20 to be positioned at different heights relative to the trimmer mechanism 7. The clevis sides 26 and 27 are joined by a top segment 30 which has a centrally located aperture 31 therein for the spindle 22.

The spindle 22 includes a head 34 and shaft 35. The shaft 35 passes through the aperture 31 and the head 34 seats on the lower side of the clevis top 30 and is large enough not to pass through the aperture 31. The spindle 22 passes through the aperture 13 in the plate 10 and a washer 36 and nut 37 are mounted on a top threaded portion 38 of the spindle 22 and utilized to secure the spindle 22 to the plate 10. The spindle 22 includes a generally smooth cylindrical lip or section 39 near the head 34. The spindle section 39 has a diameter slightly larger than the threaded portion 38 and the purpose for the section 39 will be described hereinafter.

The handle 5 includes a handle shaft 4 which extends upwardly from a rearward portion of the plate 10 at an angle between approximately 30° and 60° relative to the plate 10. The plate 10 includes a connection mechanism 46 on the rearward end thereof for attachment of the handle shaft 45 thereto. The connection mechanism 46 also includes stiffeners 47 above and below the plate 10 for strengthening the connection between the plate 10 and shaft 45. The shaft 45 also includes diverging handlebars 48 near an upper end thereof for use by an operator in controlling the apparatus 1.

Figure 5:
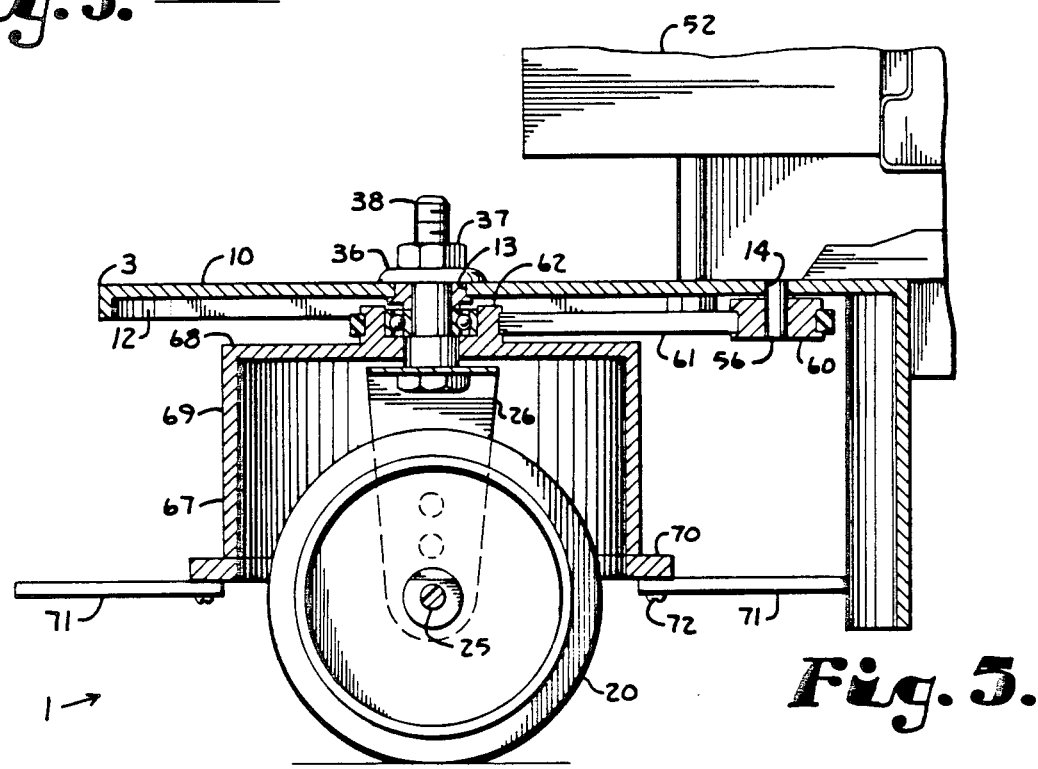
FIG. 5 is a fragmentary cross-sectional view of the trimmer, taken along line 5—5 of FIG. 4.

The motor mechanism 6 includes a motor 52. The illustrated motor 52 is a self-contained internal combustion engine utilizing gasoline. However, it is foreseen that other types of self-contained relatively low horsepower motors may be used for this purpose or even electric motors requiring an electric cord to obtain electricity from a remote source. The motor mechanism 6 also includes a fuel tank 53 for providing fuel to the motor 52. The motor mechanism 6 further includes a starter 54 and a throttle 55 for the motor 52 which are mounted on the handle shaft 45 for operator convenience. The motor 52 includes a drive shaft 56 which is mounted such that the drive shaft 56 extends through the aperture 14 in the plate 10, as is seen in FIG. 5.

Attached to the drive shaft 56 is a drive pulley 60 which communicates power from the drive shaft 56 to a drive belt 61 which in turn communicates power to a second pulley 62 mounted about the spindle 22.

The pulley 62 is attached to a cylindrically shaped, bottom opened drum 67 which is also centrally mounted about the spindle 22. The drum 67 includes a top portion 68 and a cylindrical side portion 69 attached at the top to portion 68 and to the bottom ending in and outwardly extending lower flange 70. Attached to the flange 70 by connectors 72 are cutter elements 71 which are freely movable to swing about the connection thereof to the flange 70 in a parallel plane. The illustrated cutter elements 71 are rectangularly shaped plastic strips (such as nylon); however, it is foreseen that other cutter elements such as nylon cord (self feeding) could be utilized for this purpose. An opening 73 in the drum top portion 68 provides for passage of the spindle 22 therethrough and functions as a bearing surface to allow rotation of the drum 67 relative to the spindle 22.

Positioned between the second pulley 62 and the spindle 22 are bearing means such as bearing mechanism 77 including an inner race 78 and an outer race 79 with bearings 80 therebetween. The spindle section 39 provides an upper support surface 81 for the bearing inner race 78 to ride upon.

In addition, there is an upper bushing 83 positioned in the plate 10 through which the spindle 22 passes and which has a lower extending lip or face 84 against which the upper side of the bearing inner race 78 is positioned.

The drum 67 is effectively rotated by the motor 52 through shaft 56, pulley 60, drive belt 61 and pulley 62 so as to rotate about the spindle 22 and consequently about the wheel 20. In particular, the drum 67 rotates about the spindle 22 on bearing mechanism 77. The cutter elements 71 attached to the drum 67 are forceably rotated by the drum and engage grass, weeds and the like to cut same. The elements 71 are free to rotate on connectors 72 so as to allow the elements 71 to swing inwardly if rocks or the like are engaged.

In use, an operator starts the motor mechanism 6 and grasps the handlebars 48. The rear of the apparatus 1 is then raised by the operator by pressure on the handle 5 until the plate 10 is approximately horizontally aligned. In this position, the motor mechanism 6 is mostly supported by the wheel mechanism 4 and is partially supported by the operator in a "wheelbarrow" affect.

The wheel mechanism 4 has a single, unitary or monotary ground engaging wheel 20 which, with the exception of the operator, soley supports the apparatus during normal use. This position of the center of the wheel 20 and of the location of maximum contact of the wheel 20 with the surface directly beneath and in line with the axis of rotation of the cutting elements 71, allows close control over the plane traversed by the cutting elements 71 during use and consequently allows the user to quickly and easily adjust the cutting height of the elements 72 relative to a surface to compensate for changes in terrain by simply tilting to one side or the other or rotating down in the front or back by rotation about the axis of the wheel 20.

The operator proceeds to push the apparatus 1 forward and makes turns as necessary by turning the apparatus 1 about a generally vertical axis passing through the wheel 20. As necessary for the particular area being trimmed, the operator may at any time tilt the apparatus 1 about a vertical axis passing through the center of the wheel 20 so as to swing the apparatus 1 to one side or the other side as is shown by the arrows in FIG. 3 so as to place the cutting edge of the elements 71 closer or further away from the ground as necessary for the particular environment being cut and/or tilt the plate 10 about the axis of the wheel 20 either upwardly or downwardly at the front end thereof (front is to the left in FIG. 6) also to allow for the particular terrain. In this manner, the majority of the weight of the structure is supported by the wheel 20; however, the operator has very precise control over the direction in which the apparatus 1 is pushed, such that he can change direction very simply and quickly and has the ability to quickly and easily adjust the cutting height for the particular terrain. In particular, the operator has control over tilt of the plate 10, and consequently the tilt of the cutting plane through which the cutting elements 71 rotate, both from side to side or from front to back so as to be able to closely control the cutting in view of the location and type of weeds or grass to be cut.

Shown in FIG. 8 is an alternative embodiment of the trimmer apparatus according to the present invention generally designated by the reference numeral 100. The trimmer apparatus 100 is similar in many aspects to the reference numeral 1 and description herein will be mainly directed to the differences therebetween.

The trimmer apparatus 100 comprises a housing or support structure 101, a motor mechanism 102, a handle 103, a trimmer mechanism 104, a wheel mechanism 105 and wheel support means such as arm 106. The trimmer mechanism 104 includes a drum or hemispherical shell 110 having a lower flanged edge 111 with nylon cord 112 or the like attached thereto. It is foreseen that an apparatus for feeding nylon cord could be incorporated within the shell 110 in a manner similar to that used in conventional grass trimmers to automatically feed the nylon cord 112.

The shell 110 is attached to the motor mechanism 102 by a drive shaft 113 which passes through the support structure 101 such that the shell 110 is directly rotated about a generally vertical but tiltable axis by the motor mechanism 102 which is mounted directly thereabove. The support structure 101 surrounds the shell 110 and is attached to the handle 103 which is only partially shown but which is similar to the handle 5 shown in the previous embodiment. Also attached to the support structure 101 near the rearward end thereof is the wheel support mechanism at the connection 118. The wheel support arm 106 is rotatably connected to a wheel 119 of the wheel mechanism 105 by means of an axle 120 passing through an aperture 121 in the wheel support mechanism 106. Preferably the wheel support arm 106 is bifurcated therealong so as to allow passage of the axle 120 therethrough on both sides of the wheel 119 so as to provide support to the wheel 119 on both sides thereof. The support arm 106 passes beneath the shell 110 and cord 112 and with the wheel 119 is spaced from the shell 110 to allow unrestricted rotation of the shell 110 (and cord 112) while still supporting the apparatus 100 from beneath the shell 110 and from directly beneath the axis of rotation of the cord 112.

In use the trimmer apparatus 100 is utilized much as the trimmer apparatus 1 of the previous embodiment. The major difference between this embodiment and the previous embodiment is that the wheel 119 is mounted by a structure which is not directly connected to the rotating shell 110 and the shell 110 is directly driven by the motor mechanism 102 which is positioned directly over the shell 110 and wheel 119.

It is to be understood that while certain forms of the present invention have been illustrated and described herein, it is not to be limited to the specific forms or arrangement of parts described and shown.

What is claimed and desired to be secured by Letters Patent is as follows:

1. A grass and weed trimmer apparatus comprising:
   (a) a structural frame;
   (b) an operator handle connected to said frame and adapted to be manipulated by an operator;
   (c) a single surface engaging wheel allowing locomotion of said apparatus over a surface; said wheel being connected to and supporting said structural frame; during normal operation said single wheel fully supporting said frame except for operator support provided through said handle;
   (d) rotatable cutting means connected to said frame and rotating about said wheel such that said wheel supports said frame from generally directly beneath said cutting means; said apparatus being free of additional surface engaging support structure during operational use other than that provided by said wheel and interaction with an operator such that said frame may be selectively tilted from side to side and front to back about said wheel by an operator during use to vary cutting height associated with said cutting means whereby said cutting means may be selectively positioned in close proximity to the ground at any location along a 360° arc surrounding said wheel so as to be able to cut close to the ground on any side of said wheel during use; and
   (e) motor means connected to said frame and operably driving said cutting means.

2. The apparatus according to claim 1 wherein:
   (a) said handle extends upwardly and rearwardly from said frame; and
   (b) said motor means comprises a motor located between the connection of said cutting means to said frame and said handle.

3. In a grass trimmer apparatus having only a single ground engaging support wheel and including a frame with an operator handle and a motorized rotating cutter element connected to said frame, the improvement comprising:
   (a) said wheel being mounted such that said cutter element rotates about said wheel and said apparatus being free of support means other than said wheel and handle so that said wheel fully supports said frame from generally directly beneath said cutter element and such that an operator through said handle may selectively tilt said frame from side to side and from front to back to modify the distance between a side of the trimmer and a surface being traversed thereby whereby said cutter element may selectively be positioned in close proximity to the ground at any location surrounding said wheel so as to enable a user to cut close to the ground on any side of said wheel during use.

4. A grass and weed trimmer apparatus comprising:
(a) a structural frame;
(b) an operator handle connected to said frame near a rearward end thereof and adapted to be manipulated by an operator; said handle extending upward and rearwardly of said frame and including means to allow a user to grasp said handle;
(c) a single surface engaging wheel allowing locomotion of said apparatus over a surface; said wheel being connected to said structural frame and, except for support from an operator through said handle, said wheel fully supporting said frame;
(d) rotatable cutting means connected to said frame and positioned to rotate about said wheel such that said wheel generally supports said frame from directly beneath an axis of rotation of said cutting means; said apparatus being free of additional surface engaging support structure during use other than that provided by said wheel and interaction with an operator such that said frame may be selectively tilted from side to side and front to back by an operator during use to vary cutting height associated with said cutting means whereby said cutting means may be selectively positioned in close proximity to the ground at any location along a 360° arc surrounding said wheel so as to be able to cut close to the ground on any side of said wheel during use; and
(e) said wheel being attached to said frame by a wheel supporting structure comprising a spindle; said rotatable cutting means including a drum journalled on said spindle so as to rotate about the central axis of said spindle; and
(f) motor means connected to said frame and operably driving said cutter means drum.

5. The apparatus according to claim 4 wherein:
(a) said motor means comprises a motor mounted on said frame; and
(b) said drum including a drive pulley axially attached thereto and axially rotating therewith; said pulley being drive connected to said motor.

6. The apparatus according to claim 5 including:

(a) a deflector shield depending from said frame rearward of said cutting means.

7. A grass and weed trimmer apparatus comprising:
(a) a structural frame;
(b) an operator handle connected to said frame and adapted to be manipulated by an operator; said handle extending upwardly and rearwardly from said frame;
(c) a single surface engaging wheel allowing locomotion of said apparatus over a surface and, except for operator support through said handle, fully supporting said frame;
(d) a wheel connecting mechanism comprising an arm depending from said frame;
(e) rotatable cutting means connected to said frame and positioned to rotate about said wheel such that said wheel supports said frame from generally directly beneath said cutting means; said apparatus being free of additional surface engaging support structure during normal use other than that provided by said wheel and interaction with an operator such that said frame may be selectively tilted from side to side and from front to back about the bottom of said wheel by an operator during use to vary cutting height associated with said cutting means whereby said cutting means may be selectively positioned in close proximity to the ground at any location along a 360° arc surrounding said wheel so as to be able to cut close to the ground on any side of said wheel during use; and
(f) said arm passing beneath said cutting means and said arm and said wheel being free from engagement with said cutting means; and
(g) motor means connected to said frame and operably driving said cutting means.

8. The apparatus according to claim 7 wherein:
(a) said motor means comprises a motor mounted on said frame and directly driving said cutting means.

9. The apparatus according to claim 7 wherein:
(a) said cutting means comprises a drum axially connected to said motor means and including a lower circumferential flange having attached thereto cutting elements.

10. The apparatus according to claim 9 wherein:
(a) said drum is a hemispherical shell.

* * * * *